United States Patent
DeLuca et al.

(10) Patent No.: US 9,888,085 B2
(45) Date of Patent: *Feb. 6, 2018

(54) GPS SUGGESTIONS BASED ON SOCIAL POINTS OF INTEREST (POI) METADATA

(71) Applicant: International Business Machines Corporation, Armonk, NY (US)

(72) Inventors: Lisa Seacat DeLuca, Baltimore, MD (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/941,617

(22) Filed: Nov. 15, 2015

(65) Prior Publication Data
US 2016/0269495 A1 Sep. 15, 2016

Related U.S. Application Data

(63) Continuation of application No. 14/656,349, filed on Mar. 12, 2015.

(51) Int. Cl.
*H04L 29/08* (2006.01)
*H04W 4/02* (2009.01)
*H04W 4/14* (2009.01)

(52) U.S. Cl.
CPC .............. *H04L 67/18* (2013.01); *H04L 67/10* (2013.01); *H04L 67/22* (2013.01); *H04L 67/306* (2013.01); *H04L 67/36* (2013.01); *H04W 4/021* (2013.01); *H04W 4/14* (2013.01)

(58) Field of Classification Search
CPC ................................ H04W 4/021; H04W 4/14
USPC .......... 455/414, 456–457; 370/338; 715/733, 715/742, 780; 705/14.53, 14.58; 340/686.6
See application file for complete search history.

(56) References Cited

U.S. PATENT DOCUMENTS

| | | | |
|---|---|---|---|
| 8,447,331 B2 | 5/2013 | Busch | |
| 2004/0203863 A1* | 10/2004 | Huomo | H04W 4/02 455/456.1 |
| 2010/0332326 A1 | 12/2010 | Ishai | |
| 2011/0320536 A1* | 12/2011 | Lobb | G06Q 50/01 709/205 |
| 2012/0004956 A1* | 1/2012 | Huston | G06Q 30/0207 705/14.1 |

(Continued)

OTHER PUBLICATIONS

List of IBM Patents or Patent Applications Treated as Related.
(Continued)

*Primary Examiner* — Kamran Afshar
*Assistant Examiner* — Nicole Louis-Fils
(74) *Attorney, Agent, or Firm* — Anthony V. S. England; Parashos T. Kalaitz; Daniel R. Simek

(57) ABSTRACT

A method is disclosed for providing notice of geo-locations of potential interest to a user. The method includes obtaining the user's current geo-location, collecting geo-locations indicated in the user's network-based social data, and collecting geo-locations indicated in network-based social data of other persons who are identified in the user's network-based social data. The user's current geolocation is compared with the collected geo-locations, ones of the collected geo-locations are selected responsive to the comparing, and the selected ones are presented to the user.

8 Claims, 3 Drawing Sheets

(56) References Cited

U.S. PATENT DOCUMENTS

| | | | |
|---|---|---|---|
| 2013/0297688 A1 | 11/2013 | Zheng | |
| 2013/0298030 A1* | 11/2013 | Nahumi | H04W 4/04 715/733 |
| 2014/0308977 A1 | 10/2014 | Cheung | |
| 2014/0344661 A1* | 11/2014 | Sipe | G06F 17/30029 715/230 |
| 2015/0127744 A1* | 5/2015 | Moreels | G06Q 10/0833 709/204 |

OTHER PUBLICATIONS

Lisa Seacat DeLuca, et al. "GPS Suggestions Based on Social Points of Interest (POI) Metadata ," U.S. Appl. No. 14/656,349, filed Mar. 12, 2015.

* cited by examiner

GPS SUGGESTIONS BASED ON SOCIAL POINTS OF INTEREST (POI) METADATA

BACKGROUND

Social media transactions include a user identifying a person or enterprise having a friend or connected status or the like (referred to herein as a "friend"), where the user registers this status on a server hosting the user's social media account via a network connection, and the server stores it for future reference. Social media accounts include accounts for services such as Facebook, Twitter, Instagram, Snapchat, LinkedIn, etc.

Similarly, social media transactions include a user identifying persons, organizations, events, places, services, products or other things, business or nonprofit enterprises, etc., that the user likes, deems a favorite, etc., (all of which are referred to herein as "likes"). Likes may include identifying social media accounts persons, organizations, events, etc. generally, as well as particular posted content, including content posted online on both social media accounts and elsewhere. Again, the user communicates these likes via a network to a social media host, which stores them on the user's social media account.

Also, social media transactions include a user following particular online content as feeds. As the term is used herein, "following" includes adding to the user's social media message feeds from the accounts of other social media users, where "feeds" includes content such as posts from Facebook and tweets from Twitter. Following also includes subscribing, such as subscribing to blog posts of particular bloggers, where subscribing may also include more traditional subscribing, such as subscribing to entire online publications. As used herein, the term "feeds" includes these posts and publications. Once again, the user communicates to the social media server the identity of those feeds that the user wishes to follow, and the social media server stores those feed identities for future reference.

It should be appreciated from the above that "social media data," as the term is used herein, includes identity of friends, likes and feeds.

SUMMARY

A method for providing notice of geo-locations of potential interest to a user includes obtaining the user's current geo-location. Geo-locations are collected, including geo-locations indicated in the user's network-based social data. Geo-locations indicated in network-based social data of other persons who are identified in the user's network-based social data are also collected. The user's current geolocation is compared with the collected geo-locations. Ones of the collected geo-locations are selected responsive to the comparing. The selected ones of the geo-locations are presented to the user.

System and computer program products relating to the above-summarized methods are also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings.

DETAILED DESCRIPTION

Figure 1:
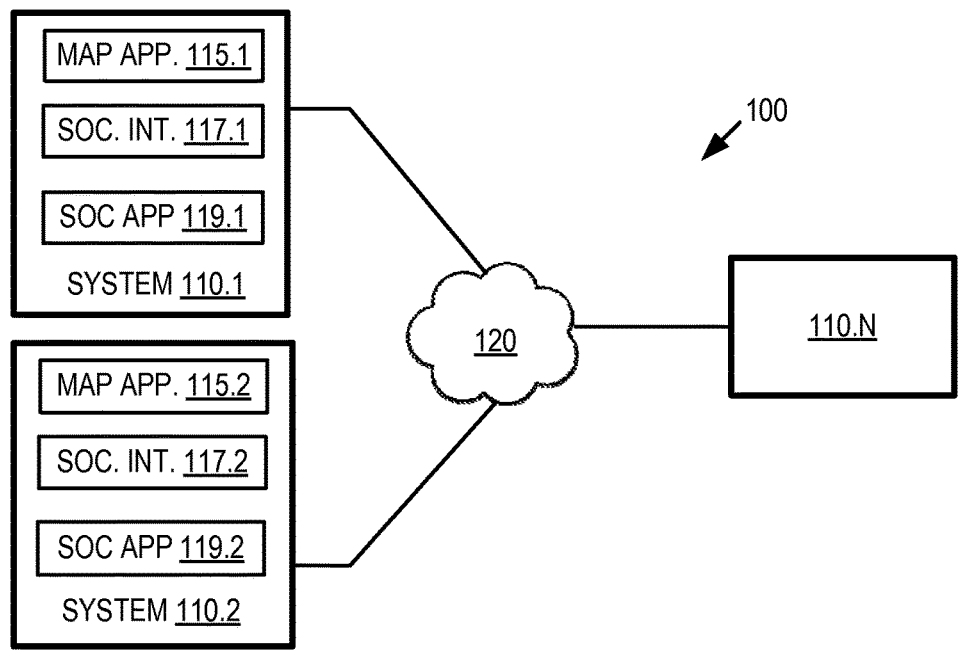
FIG. 1 illustrates a networked computer environment, according to embodiments of the present invention.

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

For each user of social media, there may be many connections that tend to go unnoticed among online activities and offline, physical activities. According to embodiments of the present invention, a service is provided that obtains information from a user's social media data and obtains the user's location or some other reference location from a GPS application on a mobile device carried by the user.

The service points out locations of interest to a user based on metadata clues, which the service identifies from the user's social media data, and based on the user's GPS location or another such reference location. (The social media data may include data from social applications such as Facebook, Twitter, Instagram, Snapchat, LinkedIn, IBM Connections, etc.)

For example, when the user is navigating via a mapping application, the reference location may be the user's location and the service may alert the user on the mapping application that he or she is driving by a restaurant where a friend works. This is not to say that the user's friend is necessarily at the restaurant currently, although this is a possibility. Rather, it is significant that the user has an association with the restaurant, wherein in this particular example the association arises because the user's friend is employed there. It may be useful to detect and prompt the user about this association so that the user may evaluate the restaurant by talking to the friend.

In another example, the user may have registered likes on his or her social media account for stores of local origin and may be unaware he or she is physically nearby such a store. Or even more particularly, the user may be unaware that the store nearby was also featured on an evening news Twitter feed that the user follows. The user may want to know every nearby store that the user has liked or may want to know more selective information, such as a liked, nearby store that is of local origin or that is of local origin and that was featured on a Twitter feed that the user follows, etc. The service may present socially significant locations such as these via a mapping application the user is viewing.

In one aspect of the present invention, collecting geo-locations includes collecting geo-locations indicated by favorable ratings of the geo-locations in the network-based social data of the user's and the other persons who are identified in the user's network-based social data. In another aspect, the collected geo-locations include geo-locations impliedly indicated by text-based context. In a further aspect, collecting the geo-locations includes collecting geo-locations indicated by text about the geo-locations in the network-based social data of the user's and the other persons who are identified in the user's network-based social data.

In a further aspect, collecting the geo-locations includes collecting geo-locations indicated by text about the geo-locations in the network-based social data of the user's and the other persons who are identified in the user's network-based social data. In another aspect, collecting the geo-locations includes collecting geo-locations indicated by references about the geo-locations in media purchased by the user and in media viewed by the user. In a further aspect, collecting the geo-locations includes collecting geo-locations referred to by persons who produce the media purchased by the user and the media viewed by the user.

FIG. 1 illustrates an example computing environment 100, according to embodiments of the present invention. As shown, computing environment 100 includes computer systems 110.1, 110.2 through 110.N and connects via network 120, which may be public or private. As depicted in FIG. 1, system 110.1 is a mobile computer system and system 110.2 is a server. Systems 110.1, 110.2, etc. include respective modules respectively, which may be program application or hardware modules configured to perform tasks for their respective devices and which will be discussed in more detail below. In FIG. 1 system 110.1 includes program application modules for a mapping application 115.1, a social interface tool 117.1, and a social application 119.1; and system 110.2 includes program application modules for a mapping application 115.2, a social interface tool 117.2, and a social application 119.2.

Figure 2:
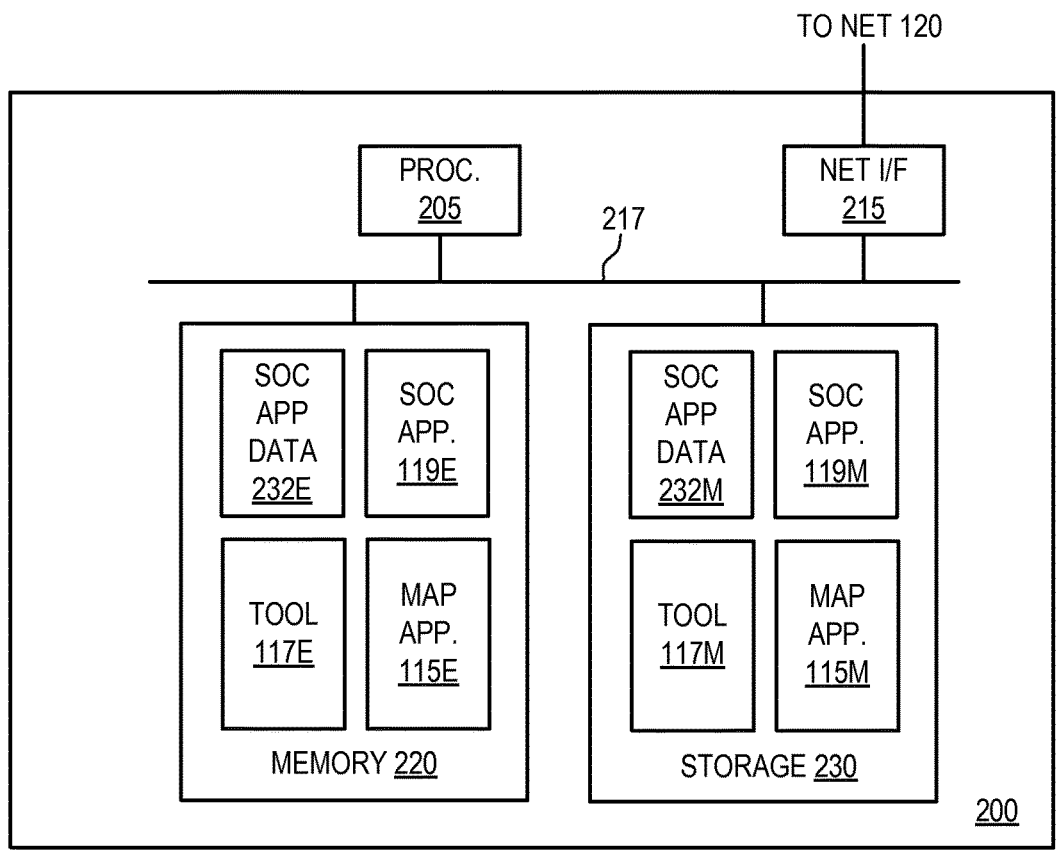
FIG. 2 is a block diagram of devices shown in FIG. 1, according to embodiments of the present invention.

FIG. 2 illustrates a system 200, which may be applied as any or all of computer systems 110.1, 110.2, etc., according to embodiments of the present invention. As shown, system 200 includes a central processing unit (CPU) 205, a network interface 215, an interconnect (i.e., bus) 217, a memory 220, and storage 230. CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is included to be representative of a single CPU, multiple CPUs, a single CPU having multiple processing cores, and the like. Additionally, memory 220 is included to be representative of a random access memory, which includes data and program modules for run-time execution, such as social application data 232E, social application program module 119E, social interface tool 117E, and mapping application program 115E, according to embodiments of the present invention, and described in more detail herein below. However, it should be understood that one or more of modules may be implemented by other hardware and may be firmware.

Data 232E and modules 115E, 117E, and 119E may be instances of data and program modules from storage 230, such as social media application data 232M and program modules 115M, 117M, and 119M shown and described in more detail herein below, for run-time execution by CPU 205 in memory 220. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

According to embodiments of the present invention, the presently disclosed service on social interface tool 117 (FIG. 2) provides suggestions for display on a mapping application 115 (FIG. 2, mapping application also referred to herein as a "geo-location application") having an interface on a user's mobile device 110.1 (FIG. 1) as a navigational aid or to show points of interest, where the suggestions are, in at least some circumstances, based on a current location of the mobile device, as determined by a GPS therein. Geo-location application 115 communicates the location to tool 117 via network 120 based on mapping application 115, such as Google Maps, Mapquest, other third-party location-based information services, such as Yelp and Foursquare, etc. and based on data 232M from the user's social media applications 119M, such as Facebook, etc., which the service may have analyzed in a background process prior to generating the suggestion.

The social data 232M that tool 117 analyzes may include the user's friends, likes and feeds and the friends, likes and feeds of the user's friends. This includes not only the identity of the friends, likes and feeds, but also their content, such as, for example, the tweets of an identified Twitter feed, the blogs of an identified blog subscription, messages from Facebook, LinkedIn messages, job history information on LinkedIn, etc.

The above-described examples and depictions in the Figures are not meant to imply architectural limitations. For example, any of devices 110.1, 110.2, etc. may be a notebook computer, hand held computer, smart phone, kiosk, automobile navigation device, etc., and may include a global positioning system (GPS). Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

Figure 3:
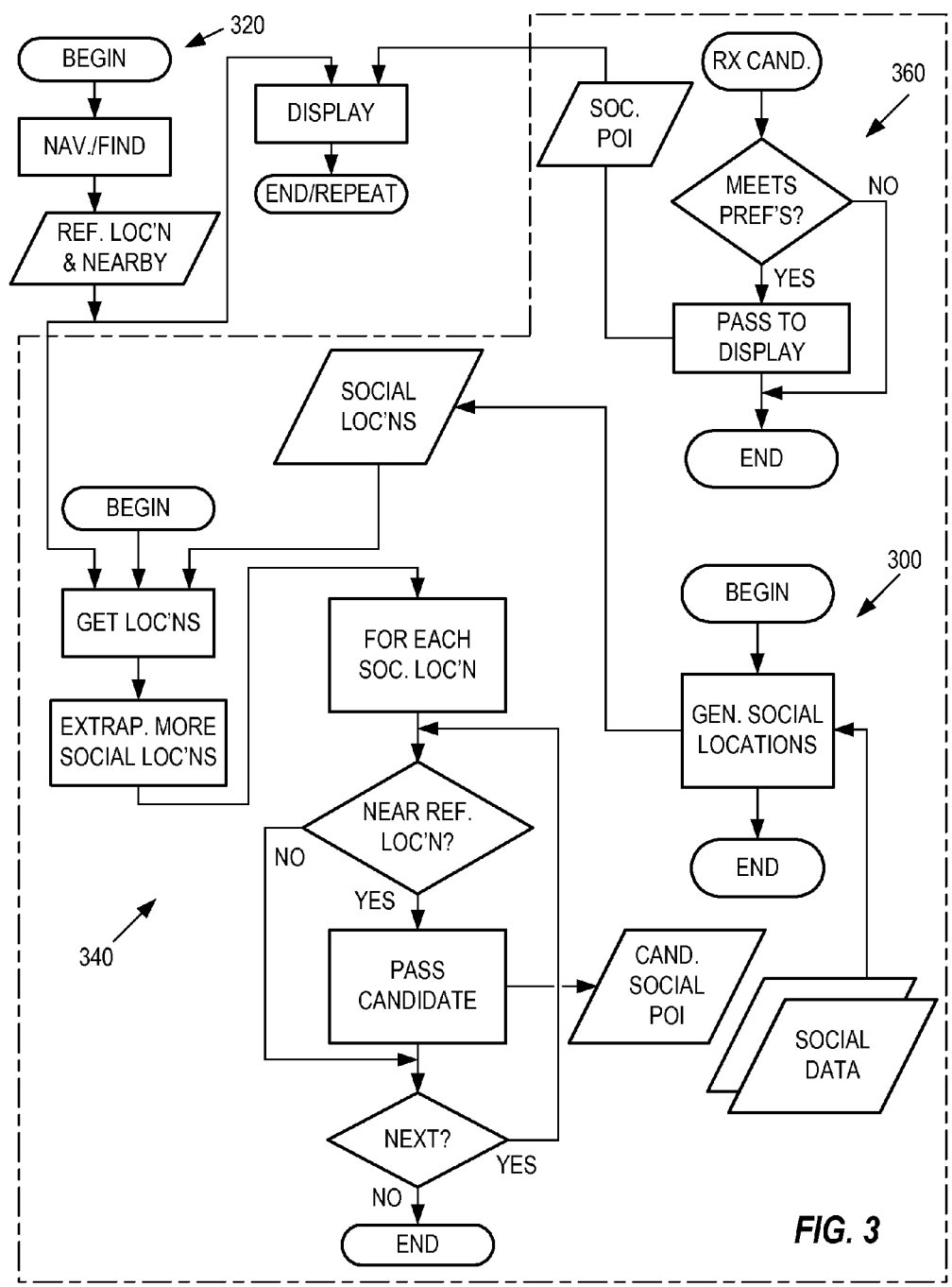
FIG. 3 illustrates a social interface tool, according to embodiments of the present invention.

Referring now to FIGS. 2 and 3 together, according to embodiments of the present invention, tool 117 executes processes 302, 340 and 360 and their sub-processes, as shown, to combine and present geolocation and social data. To accomplish this, tool 117 interfaces with navigation/mapping application 115 (herein a "geolocation" application), as previously mentioned. Application 115 includes process 320 and its sub-processes 322, 324 and 328 shown in FIG. 3, according to embodiments of the present invention. As also previously mentioned, tool 117 further interfaces with one or more social applications 119 to access data 232M.

In a first, navigational-aid way of using geolocation application 115, a user browses or navigates through a local area and, while doing so, may want general suggestions about points of interest ("POI's") nearby the user. In this context, whether a potential POI is deemed nearby will depend on its distance from the user's geo-location, so geolocation application 115 may send the user's geo-location to tool 117 as a "reference location" in this context.

In a second, find-points-of-interest way of using geolocation application 115, the user specifies a geo-location such as by entering coordinates or by selecting a spot on a map. The specified location may be referred to as the "search location" and might not be near the user. In this context, the user may want information for POI's nearby the search location, so geolocation application 115 sends the search location to 117 as the reference location in this context instead of the user's location.

Alternatively, in the find-points-of-interest way of using geolocation application 115, based on a query from the user rather than coordinates or a spot on a map, geolocation application 115 may have found a particular location or type of location, such as a restaurant or restaurant of a particular type or brand. In this context, the found location may also be referred to as the "search location" and might not be close to the user. Once again, in this context, the user may want information for POI's nearby the search location, so once again geolocation application 115 sends the search location to 117 as the reference location in this context.

In the second way of use, the search location that the user specified or that geolocation application 115 has found is the reference location. In the first way of use, the user's location is the reference location. Thus, for both ways of use, whether a potential POI is deemed "nearby" depends upon its distance from the reference location. In any of above contexts, geolocation application 115 may initiate the sending of the reference location or may send it in response to a request from tool 117 or both, according to embodiments of the present invention.

In subprocess 302, tool 117 accesses social data 232M and generates 304 identifications 306 of geo-locations having social significance ("social locations"), which makes them each a potential POI. Tool 117 may generate 304 social locations 306 independently of geolocation application 115, which process 304 does by actions including finding coordinates or other location description information stored in association with social media application 119, such as in geotags or text of photos or messages. This may include parsing messages and tags for addresses and names of places, such as businesses, landmarks, etc. Tool 117 may also generate 304 social locations 306 independently of geolocation application 115 by actions finding coordinates or other location description information stored explicitly as POI's by the users or the user's social media friends in association with social media application 119.

When tool 117 finds geotags, addresses and place descriptions in process 304 for generating social locations, it also stores surrounding messages and descriptions for display, to show the user why a POI deemed socially significant is relevant. For example, if a geotag, address or place description is found in a tweet of a Twitter feed followed by the user, the tweet is stored along with the identity of the socially related person from whom the tweet originated (or organization). This way, the user may be presented with the twitter post "I ate at Henry's Hotdogs last night and it was amazing" and the identity "@BestFriendBob" in connection with a socially significant POI on mapping application 115, such as the Henry's Hotdogs location, which tool 117 deems socially significant due to the tweet by the user's friend Bob.

Responsive to receiving, at process 342, a reference location from process 324 of geolocation application 115, tool 117 gets 342 social locations 306 and extrapolates 344 additional locations responsive to received locations 306 within an area nearby the received reference location. (For extrapolation, "nearby" may be defined by proximity that is less than a threshold distance defined by the user or by an application 115 according to a default, which may vary with context.) Extrapolating 344 may include generating additional locations of the same brand or genre as a social location 306 and may include generating locations related to liked topics or groups or equivalent on other social networks, such as, for example, the nearby headquarters for a charity the user follows on Twitter.

Once process 340 has gotten 342 social locations 306 and extrapolated 344 additional ones, it increments 346 through them, one-by-one, to determine 348 whether each is nearby the reference location received from geolocation application 115. (The threshold distance that defines "nearby" for process 348 may be different than for extrapolation 344, but nearby may still be defined by proximity that is less than a threshold distance that is defined by the user or by an application 115 according to a default, which may vary with context.) If yes, then the social location is passed 350 to process 360 to determine whether it meets other criteria of preferences set by the user. If there is a next 352 social location, process 340 branches back to determine at 348 whether the next one is nearby, etc.

Responsive to receiving, at sub-process 362 of process 360, a candidate location from process 350, tool 117 determines 364 whether it meets other criteria of preferences set by the user. Preferences may include, for example, type of establishment and time of day, such as "only show restaurants if after 11 am" or "only show brunch specific restaurants if before 3 pm," etc. They may include day of week, such as "don't show amusement type places during the week." Preferences may filter according to the social significance of the source of the socially significant POI, such as "only from close friends" or "only from the alumni association," etc. Preferences may indicate further restrictions based on the user's relationship with others in their social network. For example, the user might want to see restaurant type POIs having a "close friend" social significance, but not a mere "friend" significance.

If yes, then the social location is deemed a socially significant POI and its coordinates and other information about are passed 366 to process 326 as a socially significant POI, which communicates with geolocation application 115 according to its API. Sending 366 the social POI may include not only the coordinates and description of the location, but also socially significant information associated with the location via social data 232M, such as content of a Tweet from a feed the user follows, where the Tweet mentions the POI, for example. In response, geolocation application 115 process 328 displays the location and a description of the identity of the received, socially significant POI and also may display the associated, socially significant information about the social POI.

Figure 4:
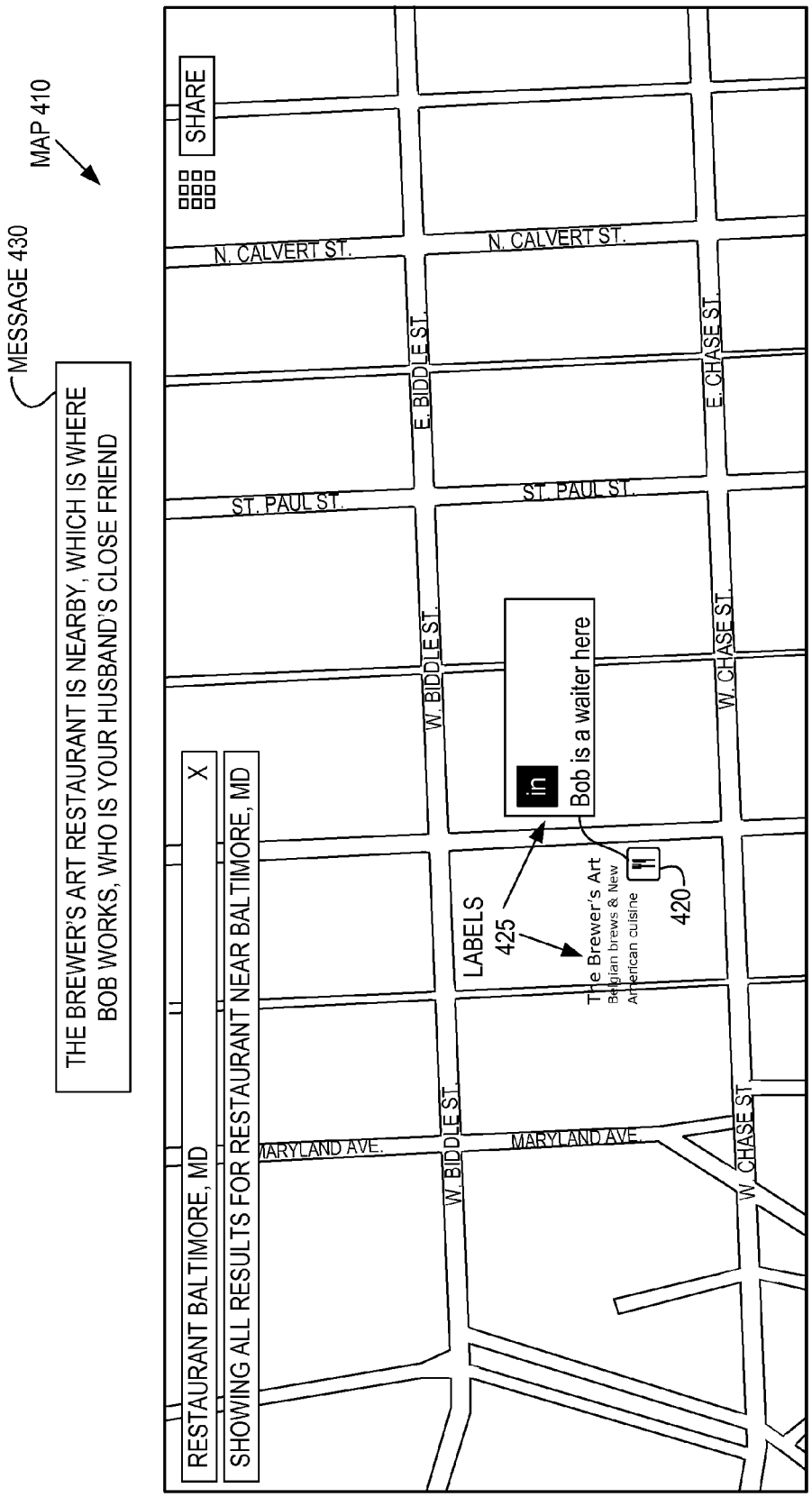
FIG. 4 illustrates social interface tool presenting information on a mapping application, according to embodiments of the present invention.

It should be appreciate from the foregoing that tool 117 evaluates social relationships of a user to provide socially significant POI's and information associated therewith via interactions and interests shared with other social contacts, according to embodiments of the present invention. This goes beyond simply making recommendations to a user about nearby locations based on a profile that a user has prepared that indicates the user's interests. Tool 117 takes a complex view of social interaction with other users and also takes into account their shared interests to reveal socially significant POI's that would otherwise not be available for mapping application 115. Additionally, according to embodiments of the present invention, tool 117 derives geo-location data from social media data. Examples, of socially significant POI's and related information that may be found and presented to the user include the following:

1. The husband of the user, Susan, has a close friend relationship with Bob, as indicated in the user's Facebook account. Susan and her husband are looking for a restaurant in Baltimore, Md., near their current location. Bob has a profile on LinkedIn indicating he works at a restaurant named "The Brewer's Art." Thus, responsive to the user's husband's friend connection in Facebook, process 304 for generating social locations looks at Bob's social media and determines where Bob works from his LinkedIn profile. Thus process 304 identifies The Brewer's Art as socially significant for Susan and identifies the social significance is that her husband is a close friend of Bob and the location is Bob's workplace. Referring to FIGS. 1 and 4, in this example when Susan is near The Brewer's Art, tool 117 identifies it and presents a message stating "The Brewer's Art restaurant is nearby, which is where Bob works, who is your husband's close friend." Specifically, tool 117 sends the location coordinates, identifying information and the message to mapping application 115, which responsively presents icon 420 at the location coordinates on map 410 of a system 110 display, presents the message 430 and presents labels 425 near icon 420, where labels 425 indicate the name of the POI and an abbreviated version of message 430. Susan and her husband decide to go by the restaurant. Bob happens to be working, so they is seated in his section, get to chat up an old friend, and even end up getting a free appetizer.

2. When the user is nearby a café "Central Perk" that is featured on a TV Show, Friends, the user watches on Hulu or Netflix, the location of the café is likewise identified on a map along with a message, "Central Perk from 'Friends' is 1 block away."

3. When the user is near a location or chain frequented by an author the user enjoys from Amazon, it is identified on a map of mapping application 115 along with a message, "*Location* frequented by *author* is nearby" (where the actual location and author are included in the message).

4. The user follows a charity, Goodwill, on Twitter. Thus, responsive to the user's follower relation on Twitter, process 304 for generating social locations looks at Goodwill's social media or websites and determines where it has locations, including headquarters and associates those as socially significant locations for the user. When the user is nearby one of the locations, tool 117 identifies it for the user and indicates that the user follows this charity on Twitter.

Regarding example 2 above, on TV or other media shows (such as video or audio based shows that are periodically published via the Internet, for example) a show may sometimes repeatedly mention a specific location, such as a café, for example. According to embodiments of the present invention, the user initializes process 304 with user login info for the user's media services like Hulu, Amazon, Netflix, HBO, etc. For generating social locations, process 304 may detect the user's subscriptions to and viewing or purchasing of particular shows, which process 304 does by logging in and accessing the user's activities on the user's media services. Likewise, regarding example 3 above, process 304 may detect that the user has purchased a book or other text-based publication such as a periodical by accessing activity on an ebook type media account of the user. In response, process 304 searches websites that report about, analyze, and review the particularly indicated shows, books and other publications subscribed to, viewed, read or purchased by the user, including websites that host user discussions of shows, books, etc. Upon finding a location repeatedly mentioned for a show, book, etc. to which the user subscribes or which the user has bought, process 304 associates the location with the show, book, etc. and stores the location as a socially significant location for the user.

Further, process 304 determines the identities of persons involved in producing the user's show, book, etc., such as author, director, actor, etc., which may be determined such as by reference to the user's media service or websites that report about, analyze or review the particularly indicated shows, books and other publications that the user has subscribed to, viewed, read or purchased. Process 304 responsively searches social media data of those identified producing persons for their geo-location references, associates those locations with the identified producing person and their show, book, etc. and stores the location as a socially significant location for the user associated with the producing person.

The disclosure herein described a service that obtains information from a user's social media data and obtains the user's location or some other reference location from a GPS application on a mobile device carried by the user. It should be understood that the service may obtain the user's location or some other reference location from a GPS application on a different device nearby the user, such as a device in a room occupied by the user or a navigation device or other device of an automobile or other transportation vehicle occupied by the user, for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing notice to a mobile device of a user of geo-locations of potential interest to the user, the method comprising:
    collecting geo-locations, including collecting geo-locations indicated as points of interest in network-based social data of the user and collecting geo-locations indicated as points of interest in network-based social data of other persons who are identified as friends in the user's network-based social data, wherein the collecting is independent of the current geo-location of the user and of the other persons who are identified as friends; and wherein the collecting includes:
        detecting media shows for which the user performs at least one of media show viewing, media show purchasing and media show renting, wherein detecting the media shows includes accessing user activity on media services of the user;
        searching websites that associate a location with the detected media shows;
        collecting the location as a socially significant location responsive to the searching of the websites; and
        storing an association between the socially significant location and the media show;
    wherein the processor is further operative with the program to execute the program for: obtaining a current geo-location of the user;
    comparing the user's current geo-location with the collected geo-locations; selecting ones of the collected geo-locations responsive to the comparing; and presenting, on the mobile device of the user, the selected ones of the geo-locations to the user responsive to the user's current geo-location, wherein when the presented location is one of the socially significant locations having at least one of the stored associations with a media show, the presenting includes presenting information about the media show.

2. The method of claim 1, wherein collecting the geo-locations comprises:
    collecting geo-locations indicated by favorable ratings of the geo-locations in the network-based social data of the user's and of the other persons who are identified as friends in the user's network-based social data.

3. The method of claim 1, wherein collecting the geo-locations comprises:
   collecting the geo-location of an employer of a person indicated in the social data of a person identified as a friend in the user's network-based social data.

4. The method of claim 1, wherein the collected geo-locations include geo-locations impliedly indicated by text-based context.

5. The method of claim 4, wherein collecting the geo-locations comprises:
   collecting geo-locations indicated by text about the geo-locations in the network-based social data of the user's and feeds of the other persons who are identified as friends in the user's network-based social data.

6. The method of claim 1, wherein collecting the geo-locations comprises:
   collecting geo-locations indicated by references about the geo-locations in text-based publications purchased by the user and in text-based publications viewed by the user.

7. The method of claim 6, wherein collecting the geo-locations comprises:
   collecting geo-locations referred to in feeds of persons who produce the media shows and text-based publications purchased by the user and the media shows and text-based publications viewed by the user.

8. The method of claim 1, wherein collecting the geo-locations comprises:
   collecting the geo-location of a friend indicated in the social data of a friend identified in the user's network-based social data.

* * * * *